United States Patent

Zelenko

[15] 3,643,801
[45] Feb. 22, 1972

[54] DISPOSABLE AQUARIUM FILTER

[72] Inventor: Harry Zelenko, 150 East 61st St., New York, N.Y. 10021

[22] Filed: Aug. 22, 1969

[21] Appl. No.: 852,190

[52] U.S. Cl. ...........................................................210/169
[51] Int. Cl. .......................................................E04h 3/20
[58] Field of Search ...............210/169; 119/5; 156/179, 276, 156/292; 161/68, 69, 160, 161, DIG. 4

[56] References Cited

UNITED STATES PATENTS 3,540,593  11/1970  Stewart..................................210/169
3,487,440  12/1969  Newsteder.............................210/169

OTHER PUBLICATIONS

Auslegeschridt 1,032,965 6/26/58, Germany, Jepsen,

*Primary Examiner*—Reuben Friedman
*Assistant Examiner*—T. A. Granger
*Attorney*—Edward F. Levy

[57] ABSTRACT

A disposable aquarium filter has a filter medium sealed within a filter housing. The housing has one compartment for the filter medium and another compartment for receiving the end portion of an air supply tube, the compartments being oriented and arranged so that air discharging from the air supply tube functions to circulate water through the filter compartment. When the filter medium becomes contaminated or clogged, the entire filter including the housing with the filter medium therein is discarded. A new, unused filter is installed by withdrawing the air supply tube from the old filter and reinserting it into the new filter.

9 Claims, 3 Drawing Figures

PATENTED FEB 22 1972      3,643,801

INVENTOR.
HARRY ZELENKO
BY
Edward F. Levy
ATTORNEY 3,643,801

DISPOSABLE AQUARIUM FILTER

BACKGROUND OF THE INVENTION

Aquariums used in the home for raising fish and other sea life usually are provided with devices to filter and aerate the water. Without filtration, the water in such aquariums would become contaminated with excretions from the fish and with other foreign matter which may fall into the aquarium tank. For cleaning the water in an aquarium, filters containing a filter medium, through which the water in the aquarium is circulated, are generally used. Eventually the filter medium becomes contaminated or clogged and has to be replaced or cleaned. This is accomplished in some known filters by removing a cartridge from the filter housing and replacing it with a fresh cartridge. In other cases, the filter medium is washed or replaced with new but loose filter material. This is frequently a bothersome and distasteful task in that it involves removing the filter medium from a filter housing and handling a contaminated or dirty filter medium.

The aforesaid and other difficulties in known filters are eliminated, according to the present invention, by providing a completely disposable filter in which the filter medium is sealed. Thus, when the filter medium becomes contaminated or clogged, the entire filter, including the filter medium and the housing in which it is sealed, is discarded and replaced with a new, unused filter. It is not necessary to handle the filter medium as it always remains sealed in the housing, even upon being discarded.

The disposable filter of the present invention may be readily replaced merely by withdrawing an air tube from the old filter and reinserting the air tube into a new filter. The filter of the present invention is adapted to be manufactured at a relatively low cost so that it can meet the economic and practical requirements of disposability. It is lightweight and adapted to be made of clear plastic so that its internal functioning may be observed at all times.

Accordingly, an object of this invention is to provide a new and disposable aquarium filter having a filter medium sealed therein, which filter is disposable.

Another object is to provide an inexpensive and simple filter device for effecting filtration, aeration, and circulation of the water through the aquarium, and which will give generally efficient and durable service.

Additional objects and advantages of the invention will become apparent during the course of the following specification when taken in connection with the accompanying drawings.

SUMMARY OF THE INVENTION

In accordance with the invention herein, there is provided a disposable aquarium filter comprising a housing having a filter compartment containing a filter medium. Inlet openings at an upper end portion of the housing admit water to the filter compartment. The housing also has an air and water compartment adjacent to the filter compartment. The air and water compartment has an opening adapted to receive the end portion of an air supply conduit and is also provided with air and water outlet openings at upper portion for discharging air and water to the aquarium tank. Passage means connect the two compartments at a lower end portion of the housing, whereby air discharged into the air and water compartment by the air supply tube rises in the latter compartment, drawing in water from the lower portion of the adjacent filter compartment for discharge with said air through said air and water outlet openings. Water drawn out of the lower portion of the filter compartment is replaced by water entering the upper portion of the filter compartment through said inlet openings.

DETAILED DESCRIPTION

Figure 1:
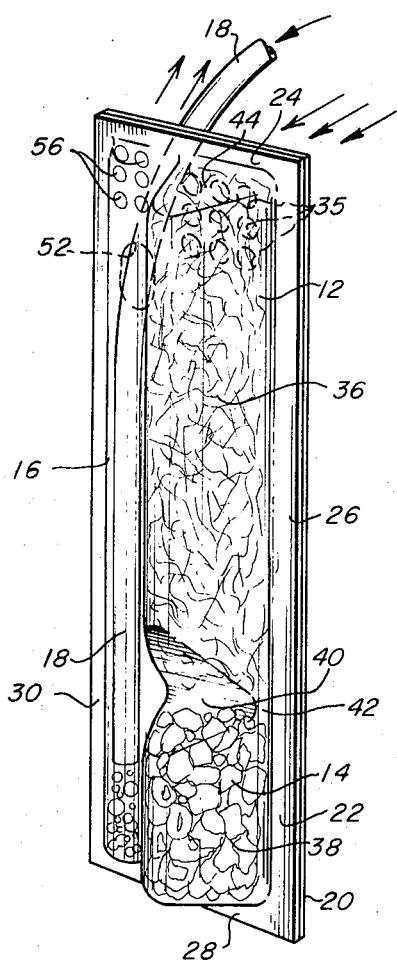
FIG. 1 is a side perspective view of a disposable aquarium filter constructed according to the invention.

Referring to the drawings, there is shown a preferred embodiment of a disposable aquarium filter comprising an elongated housing 10 having three compartments 12, 14, 16. The compartments 12 and 14 contain filter media while the compartment 16 is adapted to receive the end portion of an air tube 18 by means of which water is circulated through the filter, as will be described.

The housing 10 is readily formed from two sheets of plastic material, that is, a generally flat back sheet 20 and a blistered front sheet 22 molded to form projecting compartments. The two sheets 20, 22 are rectangular and have the same overall dimensions, the sheets being joined to one another along their marginal edges by suitable means, for example by continuous lines of heat sealing along the border areas 24, 26, 28, and 30. A further heat seal 32 joining the two sheets 20, 22 is provided between the compartments 12 and 16. The seal 32 extends from the upper border seal 24 to a location 34 (FIG. 2) short of the bottom border seal 28 whereby such seal 32 isolates the upper portions of compartments 12 and 16 from one another but, as will be further described, allows for communication between the lower portions of compartments 14 and 16.

The two compartments 12 and 14 contain different types of filter material. In the illustrated embodiment, the upper compartment 12 is shown as being filled with glass wool 36 and the lower compartment with charcoal 38. During normal operation, water from the aquarium tank enters the compartment 12 through inlet openings 35 provided in the back sheet 22.

As can best be seen in FIG. 1, the two compartments 12, 14 are formed one above the other by an elongated blister on the front sheet 22 with an indentation 40 formed in said front sheet 22 to divide the elongated blister into the compartments 12 and 14. The indentation 40 in the front sheet 22 does not extend all the way back to the back sheet 22 but rather terminates short thereof, thereby to define a restricted passage 42 between the bottom of the indentation 40 and the back sheet 22. The passage 42 extends across the width of the compartments 12, 14, that is from seal 32 to seal 26. The passage 42 is large enough to allow water to pass therethrough but small enough to prevent the filter media 36 or 38 from passing therethrough during handling and shipment of the filter. In this regard it will be noted that the body of glass wool 56 is a mass of intermingled and interwined fibers and the passage 42 is made of such a size as to prevent the glass wool 36 from passing into compartment 14 as the water flows through passage 42 from compartment 12 to compartment 14 during normal operation.

In the illustrated embodiment, the transverse or horizontal cross-sectional configuration of the compartments 12 and 14, is somewhat triangular, with one side 44 (FIG. 1) of the triangle extending substantially perpendicularly from the plane of the back sheet 20. Thus the compartments 12, 14 are not symmetrical about a vertical bisecting plane and this accounts for the triangular appearance of the indentation 40 in FIG. 2.

Figure 3:
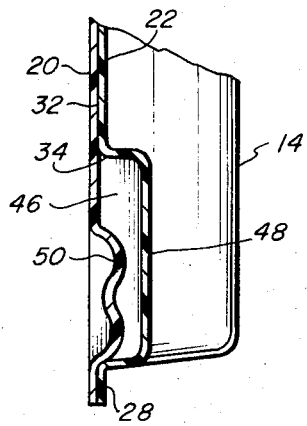
FIG. 3 is a sectional view taken along the line 3—3 of FIG. 2

A passage 46 is also provided between compartments 14 and 16. This passage 46 which extends from the bottom end 36 of the intermediate seal 32 to the bottom border seal 28 allows water to pass from compartment 14 to compartment 12 but is sufficiently restricted to prevent the charcoal 38 from passing into compartment 16. As can best be seen in FIG. 3, the passage 46 is formed by a relatively shallow blister 48 formed in the front sheet 22 and connecting the relatively deeper blisters forming the compartments 14 and 16. As may be desired, the back sheet 20 may be provided with protrusions 50 extending into the bottom part of passage 46 to provide a further restriction against the passage of charcoal 38 into compartment 16.

The compartment 16 extends the full length of the filter, that is from the upper border seal 24 to the lower border seal 28. An oblong opening 52 in the back sheet 20 leading into compartment 16 is adapted to receive the end portion of the aforementioned air tube 18. Thus the air tube 18 may be inserted into the opening 52 and passed into elongated compartment 16 to the position shown in the drawings wherein the end 54 of the tube 18 is located a short distance above the upper end of passage 46.

Figure 2:
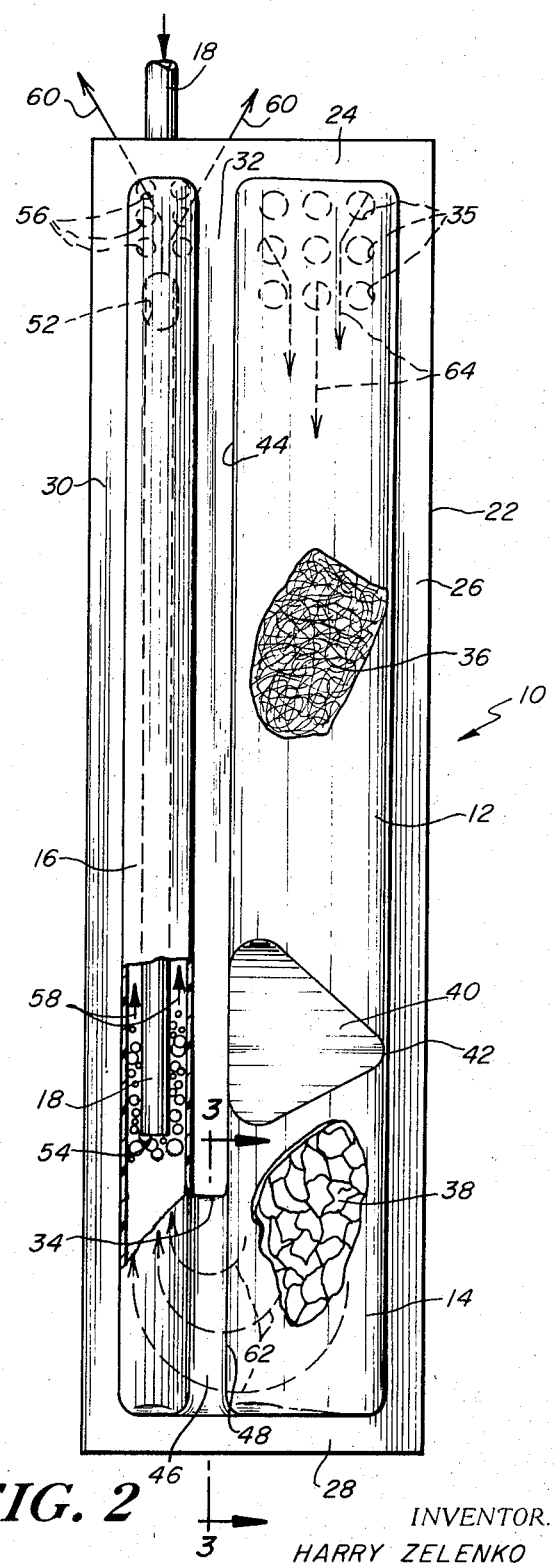
FIG. 2 is an elevational view, partly broken away in several areas, of the disposable aquarium filter shown in FIG. 1 but on a larger scale.

The outer diameter of the air tube 18 is appreciably smaller than the transverse horizontal cross section of compartment 16 as clearly shown in FIG. 2. Openings 56 are provided in the back sheet 20 adjacent the upper portion of compartment 16 whereby air and filtered water exit from the filter through these openings 56 as will be described.

In operation, the filter unit is placed in an aquarium tank (not shown) oriented as shown in the drawings, that is, with the longitudinal axis substantially vertical and the openings 35 and 56 uppermost. The entire filter is placed below the water level so that it is completely immersed. A suitable support in the form of a bracket or clip (not shown) may be provided to suspend or hold the filter on the inside vertical wall of the aquarium tank. Alternatively, the bottom border seal 28 may rest on the bottom of the aquarium tank and the entire unit supported in its generally upright position by the air tube 18.

The air tube 18, which is inserted into the compartment 16 as previously described, is supplied with a continuous supply of air from a conventional aquarium air pump (not shown). Thus, with the filter completely immersed and water entering the inlet openings 35, the air exiting from the tube end 54 will pass or bubble up on the outside surface of tube 18 within the compartment 16 as shown by the arrows 58 in FIG. 2. As the air bubbles up, it will carry water along therewith and will cause a stream of water to flow upwardly in the compartment 16. The air and water will exit compartment 16 through the outlet openings 56 at the upper portion of the filter, as indicated by arrows 60. As this stream of air and water rise in the compartment 16, water will be drawn into the lower portion of compartment 16 through passage 46, as shown by arrows 62. Thus, starting from the submerged inlet openings 35 at the upper portion of compartment 12, it will be apparent that water will pass through such inlet openings 35 into compartment 12, as shown by arrows 64, pass through the mass of glass wool 36, exit compartment 12 through passage 42, pass through the charcoal 38, and thence pass through passage 46 into compartment 16 where it will be carried upwardly for exit through the discharge openings 56 as previously described.

As the water enters the filter through the inlet openings 35 and circulates through the filter as above described, the glass wool 36 and charcoal 38 remove both waste gases and solids before the water returns to the aquarium tank through the discharge openings 56. Also the water in the aquarium is circulated and aerated as the air exits from the end of the air tube 18 and passes or bubbles up to the surface of the aquarium tank.

When the glass wool 36 and/or charcoal 38 becomes contaminated or clogged, the entire filter is replaced with a new one. It is a relatively simple operation to withdraw the tube 18 from the compartment 16, discard the contaminated or clogged filter, and reinsert the tube 18 into a new or fresh filter.

The entire filter herein described may be made relatively inexpensively from two sheets of plastic, one sheet which is substantially flat and the other which has blisters formed therein as previously described. The filter media, i.e., the glass wool 36 and charcoal 38, are placed in the blister compartments before the two plastic sheets 20, 22 are joined together whereby after they are joined along the seal areas 24, 26, 28, 30, 32, the glass wool 36 and charcoal 38 are sealed in the filter. The plastic for the front and back sheets 20, 22, respectively, may be transparent rigid vinyl or semirigid or similar plastic. The blisters may be vacuum formed in the front sheet 20 using conventional forming techniques and the back sheet 22 may be heat sealed thereto along the seal areas 24, 26, 28, 30, 32 as previously described.

Although the filter has been shown in a particular configuration, it may take on other shapes as may be desired. For example, the compartments 12, 14 may be made into one compartment by dispensing with indentation 40. In such a case, a single filter medium or a mixture of two or more filter media may be employed in the resulting single filter compartment. Also instead of clear plastic, any rigid impervious material may be used. Other filter media besides glass wool and charcoal may be used. For example, the glass wool may be replaced by polyester wool.

While a preferred embodiment of the invention has been shown and described herein, it will be obvious that numerous omissions, changes, and additions may be made in such embodiment without departing from the spirit and scope of the invention.

What is claimed is:

1. A disposable aquarium filter comprising a unitary, self-contained housing formed of a back sheet and a front sheet coextensive therewith and laminated thereto, at least one of said sheets being blistered, said blisters defining a vertically disposed filter compartment and an air and water compartment vertically disposed and horizontally adjacent said filter compartment, said filter compartment containing a filter medium sealed therein, inlet openings at an upper end portion of said back sheet for admitting water to said filter compartment, air and water outlet openings at an upper end portion of said back sheet for discharging air and water from said air and water compartment, said latter compartment having an air supply inlet aperture, passage means extending horizontally between and connecting said two compartments at a lower end portion of said housing, whereby air discharged into said air and water compartment rises in the latter compartment drawing in water from the lower portion of the adjacent filter compartment for discharge with said air through said air and water outlet openings.

2. A disposable aquarium filter according to claim 1 wherein said blistered sheet is formed with a depressed portion defining a restricted passage dividing said filter compartment into two sections, each of said sections containing a different filter medium, said restricted passage being constructed and arranged to maintain the two filter media in their respective compartments while allowing water to pass therebetween.

3. A disposable aquarium filter according to claim 1 wherein said back sheet is substantially flat and said front sheet has blisters configured to define said filter compartment and said air and water compartment.

4. A disposable aquarium filter according to claim 3 wherein means are provided for sealing said two sheets to one another at selected seal areas, one of said seal areas extending between said compartment and another extending around the border of the housing.

5. A disposable aquarium filter according to claim 4 wherein said one seal area has a lower end terminating at the upper end of said passage means, and the air supply inlet aperture is disposed in said air and water compartment above the elevation of the upper end of said passage means.

6. A disposable aquarium filter according to claim 3 wherein said passage means is defined in part by a blister on said front sheet connecting the blisters defining the filter compartment and the air and water compartment.

7. A disposable aquarium filter according to claim 3 further comprising protrusions in said back sheet in the area of said passage means to restrict said passage means and prevent the filter medium from passing therethrough.

8. A disposable aquarium filter according to claim 1 wherein said housing is elongated and adapted to be totally immersed in an aquarium tank with its longitudinal axis substantially vertically disposed, said inlet openings and air and water outlet openings being located at the upper longitudinal end portion of said elongated housing.

9. A disposable aquarium filter according to claim 1 wherein said air and water compartment has a transverse cross-sectional area greater than the outer diameter of said air supply conduit.

* * * * *